Patented Feb. 21, 1950

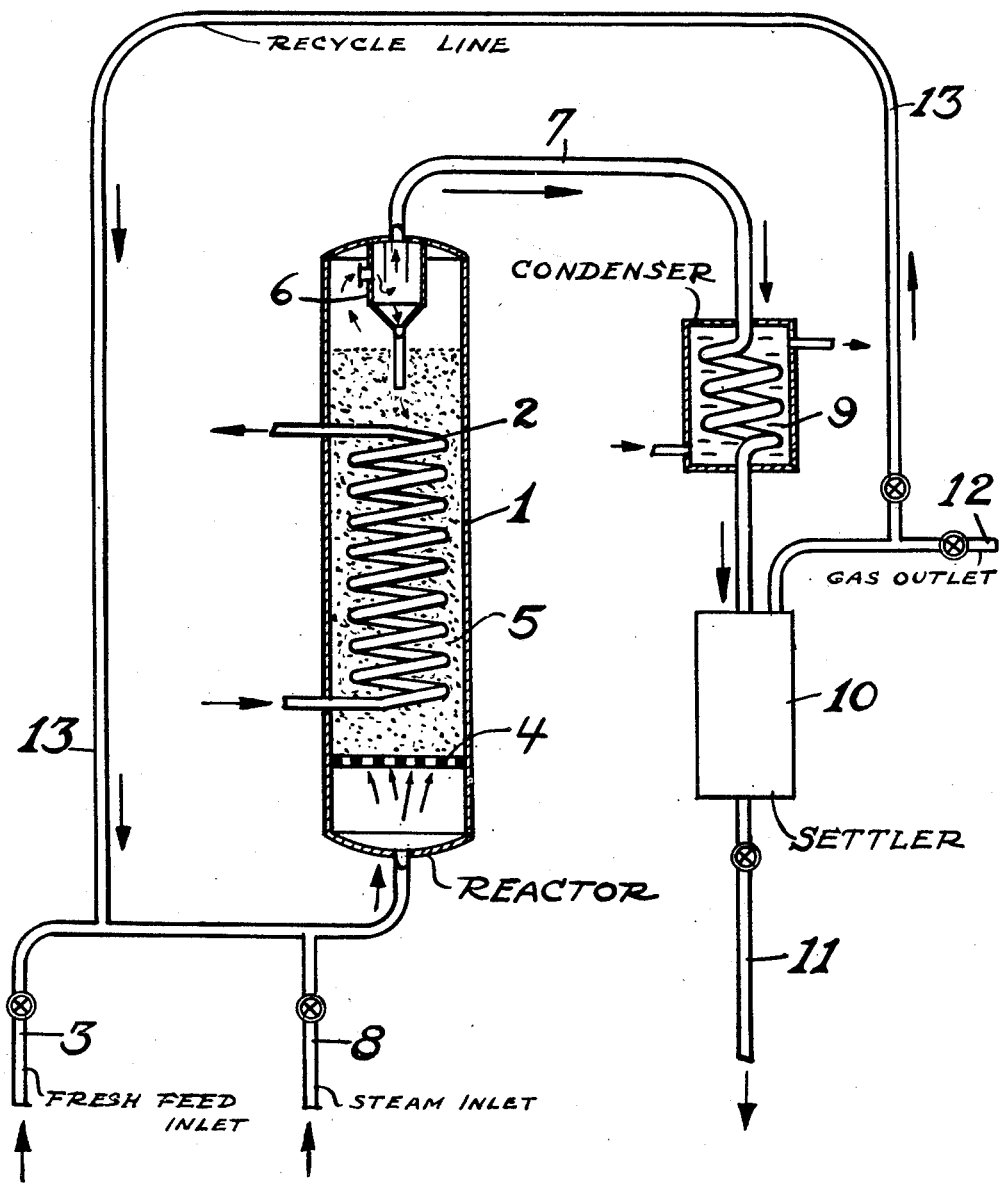

2,497,964

UNITED STATES PATENT OFFICE 2,497,964

SYNTHESIS OF HYDROCARBONS

Simpson D. Sumerford, Baton Rouge, La., assignor to Standard Oil Development Company, a corporation of Delaware Application July 20, 1946, Serial No. 685,012

1 Claim. (Cl. 260—449.6)

The present invention is directed to an improved process for producing valuable liquid products from gas mixtures composed predominantly of carbon monoxide and hydrogen. More specifically, it is directed to the synthesis commonly known as the Fischer synthesis for producing hydrocarbons and oxygenated liquid compounds from carbon monoxide and hydrogen.

In the Fischer synthesis a mixture predominantly composed of carbon monoxide and hydrogen is contacted with a catalyst, such as a metal of the iron group, particularly iron, at a temperature in the range of 350 to 750° F., particularly between about 500 and 700° F., to produce liquid products. In recent years this synthesis has been improved by using the catalyst in the form of finely divided particles which are maintained in suspension by the reaction gases passing through the reaction zone. The catalyst is present in the reaction zone in the form of particles which are, in general, smaller than 10 mesh and the bulk of which pass 100 mesh, the body as a whole including particles of various sizes ranging from about 5 microns upwardly. The maintenance of a wide particle size distribution is important to the proper fluidization of the catalyst in the reaction zone in a suitably dense suspension. With a given particle size distribution and with a given gas flow through the reactor, the density of the suspension in the reactor can be fairly closely controlled.

Considerable difficulty has been encountered by reason of the formation of carbon in the reaction. This carbon has an effect quite different from and in addition to carbon which is deposited in the ordinary fixed bed operation. In the fluidized solid operation the deposition of carbon causes a further subdivision of the catalyst particles with a consequent build-up of the extremely small particles. This disturbs the entire particle size distribution and consequently renders impossible close control of the density of the suspension in the reactor since the particle size distribution is continually changing. Furthermore, the extremely fine particles are difficult to retain in the reaction zone when they are present in the entire mass in a preponderance. The formation of carbon also causes an expansion of the fluidized mass which in itself leads to departure of catalyst from the reaction zone.

Various attempts have been made to minimize this carbon formation. Its elimination is important not only from the point of view of control but from the point of view of efficiency, it being obvious that the more carbon in the feed gas which goes to the formation of elemental carbon the less valuable liquid products are produced.

The present invention is based on the discovery, empirical in nature, that, if water is fed into the reaction zone, the formation of carbon is greatly minimized. This discovery is characterized as empirical because the exact mechanism by which the carbon is formed is not clearly understood. Therefore, there were available no facts from which one could reason that the addition of water would have a beneficial effect.

In carrying out the process of the present invention, the preferred catalyst is iron. This iron may be obtained from innumerable sources. For example, a valuable iron catalyst is obtained by reduction of iron pyrites ash at temperatures of the order of 950° F. with hydrogen. In like manner a useful catalyst is obtained by reducing red iron oxide under similar conditions. Reduced hematite also constitutes an effective catalyst. It is to be understood that the reduction is not necessarily carried to the point of pure iron. The catalyst may be promoted by various substances, such as alkali metal oxides or carbonates, or fluorides, as well as by other metal oxides, such as chromium oxide, alumina, magnesia, and the like. Promoting agents of the latter type are useful, also, in improving the fluidizing characteristics of the catalyst. A particularly useful catalyst is one obtained by fusing natural magnetite with 3% $Al_2O_3$ and 1.5% $K_2O$ and reducing the fusion product as heretofore described.

The amount of steam employed in accordance with the present invention may vary from 0.05 to 0.8 part by volume of steam per part of hydrogen in the total feed. The hydrogen, on the other hand, will usually vary from 0.5 to 10 parts per part of carbon monoxide in the total feed. An effective range of ratios in the total feed gas is 1 to 5 parts of hydrogen per part of carbon monoxide, and in the fresh feed from 1 to 2 parts of hydrogen per part of carbon monoxide with the steam being proportioned to the hydrogen in the ratios specified. The actual amount of steam employed may be less than the lower limit above mentioned so long as it is sufficient to provide an oxidizing atmosphere at the inlet to the reactor.

Another way to fix the amount of steam added to the feed is on the basis of the oxygen content of catalyst in the reactor. Desirable operation has been promoted by maintaining an oxygen content of the catalyst between about 5 and 30% by weight, particularly at least 10%. For this purpose the steam need not be added continuously but may be added intermittently in suitable amounts to maintain the desired oxygen content in the catalyst.

The reaction may be conducted over a wide range of pressures. The pressure will ordinarily exceed about 100 lbs./sq. in. Pressures of the order of 400 to 600 lbs./sq. in. are particularly desirable. The combined employment of steam and high pressure simultaneously is indicated to be particularly advantageous in minimizing the formation of carbon.

As indicated heretofore, the catalyst is employed in a finely divided state and is characterized by a wide distribution of particle sizes ranging from about 5 microns to not greater than 10 mesh with a predominant portion passing 100 mesh. With this type of catalyst the reaction gases are passed through the reaction zone at a superficial velocity between about .3 and 5 ft./second, particularly between about 0.5 and 2.0 ft./second. In this range of velocities, the catalyst in the reaction zone is in the form of a dense suspension in which the solid constitutes at least 7% by volume. It is preferably of the order of 15 to 20% and may be higher, up to about 50%. The individual particles in this suspension travel at a high velocity in a tortuous erratic path. This results in the most extraordinary mixing which provides for uniform temperature and uniform reaction rate throughout the reaction zone. In order to maintain the temperature at a fixed level, internal heat exchange equipment may be utilized as, for example, in the form of a tube bundle in which a fluid heat transfer medium is circulated. The efficiency of the heat transfer is greatly improved by the turbulent motion of the finely divided solid around the heat exchange equipment.

The nature of the present invention may be more clearly understood from the following detailed description of the accompanying drawing in which the single figure is a front elevation in diagrammatic form of one type of unit suitable for the practice of the present invention.

Referring to the drawing in detail, numeral 1 designates a reactor provided with internal cooling means indicated symbolically by coil 2. The feed containing carbon monoxide and hydrogen is introduced into the bottom of the reactor through line 3. This reactor is provided with a bottom grid or grate 4 above which is maintained a fluidized mass of catalyst particles 5. The upper part of the vessel is provided with a cyclone separator 6 for returning catalyst entrained in vapors leaving the reactor through line 7 to the dense suspension of catalyst in the reactor. Steam is added to the feed line 3 through branch line 8. The amount of steam added will be in the range heretofore specified. If desired, steam may be injected at various points along the reactor directly into the fluidized solid.

The product in overhead line 7 is carried thereby first through a condenser 9 and then through a settler 10 in which readily condensible products are separated and drawn off through line 11. In the event that catalyst fines are not entirely removed by the cyclone separator 6, these fines will be suspended in the condensate in separator 10. A portion of this condensate may be continually returned to the reactor or the fines may be filtered out therefrom and returned to the reactor as a slurry in water, if desired, or in part of the liquid product.

The normally gaseous constituents are drawn off from separator 10 through line 12. Any desired proportion of these gases may be recycled to the feed line 3 through line 13.

In order to demonstrate the effect of the addition of water in accordance with the present invention, reference may be had to the following comparison of results from two laboratory runs (in a 2-liter catalyst capacity unit) made with the same type catalyst and under the same operating conditions except for addition of steam.

The catalysts used in both these runs were prepared by fusing natural magnetite with 3.0% $Al_2O_3$ and 1.5% $K_2O$. Operation was at 650° F. and 400 p. s. i. g. with a fresh feed containing $H_2$ and CO in the ratio of 2/1 at a fresh feed rate of 1200–1700 v./v./hr. The catalysts were reduced with $H_2$ to substantially 0% $O_2$ before synthesis operation was started.

*Process data*

| Run No. | Hours | Conv. | Added $H_2O$ | cc./m.³ $H_2$+CO Cons. | | |
|---|---|---|---|---|---|---|
| | | | | $C_3$+ +EtOH | $C_4$+ +EtOH | EtOH |
| 37 | 57–80 | 98 | 0 | 254 | 209 | 29 |
| | 129–152 | 98 | 0 | 270 | 226 | 39 |
| | 201–224 | 97 | 0 | 253 | 221 | 39 |
| 39 | 56–79 | 98 | 340 | 287 | 241 | 53 |
| | 123–151 | 97 | 340 | 273 | 223 | 60 |
| | 200–211 | 97 | 340 | 278 | 221 | 71 |

*Catalyst data*

| Run No. | Synthesis, Hours | B. D. g./cc.[1] $O_2$ Free | Microns | | | | Per cent C |
|---|---|---|---|---|---|---|---|
| | | | 0–20 | 20–40 | 40–60 | 80+ | |
| 37 | 0 | 1.8 | 1 | 1 | 7 | 91 | |
| | 387 | 0.9 | 52 | 2 | 14 | 24 | 38 |
| 39 | 0 | 1.8 | 3 | 1 | 5 | 91 | |
| | 331 | 1.5 | 26 | 8 | 13 | 53 | 11 |

[1] B. D., g./cc. means bed density in grams per cc.

Another catalyst used in Run 34 under different operating conditions without added steam showed still more catalyst disintegration and higher carbon formation. This catalyst was prepared by impregnating roasted iron pyrites ore (substantially all $Fe_2O_3$+$Fe_3O_4$) with 1% KF, and was completely reduced. Operation was at 600° F. and 250 p. s. i. g. with 1/1 $H_2$/CO ratio in the fresh feed. Catalyst data are given below.

| Run No. | Synthesis, Hours | B. D. g./cc. Oxidized | Microns | | | | Per cent C |
|---|---|---|---|---|---|---|---|
| | | | 0–20 | 20–40 | 40–80 | 80+ | |
| 34 | 0 | 1.9 | 14 | 16 | 45 | 25 | |
| | 297 | 0.4 | 96 | | 4 | | 60 |

The mechanism whereby added steam suppresses carbon formation is not clearly known, nor is the optimum amount of steam necessarily that which was added in Run 39. The amount of added steam may be such that the mole ratio of $H_2$/$H_2O$ in the total feed covers the range of 100/1 to 5/1 but preferably the ratio should be that to give an oxidizing atmosphere at the reactor inlet. The range of operating conditions and preferable conditions are tabulated below.

| | Temp., °F. | P. s. i. g. | $H_2$/CO in Fresh Feed | Fresh Feed v./v./Hour |
|---|---|---|---|---|
| Range | 450–750 | 100–1,000 | 0.5–3.0 | 100–3,000 |
| Preferred | 550–700 | 350–500 | 1–2 | 500–1,500 |

In the foregoing runs the fresh feed rate was in a preferred range. This fresh feed rate may vary from 100 to 3000 v./v./hour, the preferred range being 500–1500 v./v./hour. It will be understood, of course, that the other conditions of operation indicated in the particular example may be varied within the ranges for these conditions heretofore specified. This specific example is not intended to prescribe any specific operating conditions but merely to illustrate the effect of added steam on the operation. It is thought to be evident that the added steam does serve effectively to reduce carbon formation and to minimize degradation of the catalyst. It is to be borne in mind that this degradation of the catalyst as heretofore explained is of great importance because a very substantial change in the particle size distribution of the catalyst results in a marked change in its fluidizability, a reduction in which is reflected sharply in erratic uncontrollable temperatures and reaction rates.

The nature and objects of the present invention having been thus described, what is claimed as new and useful and desired to be secured by Letters Patent is:

In the production of valuable liquid products by the interaction of carbon monoxide and hydrogen in the presence of a fluidized finely divided iron type catalyst with which the reactants are contacted at a temperature between about 500° and 700° F. and under a pressure of the order of 400–600 lbs./sq. in., the step of maintaining in the catalyst an oxygen content between about 5% and about 30% by weight by injecting into the reactor a quantity of steam ranging from about 0.05 to 0.8 part by volume of steam per part of hydrogen in the total feed.

SIMPSON D. SUMERFORD.

REFERENCES CITED

The following references are of record in the file of this patent:

UNITED STATES PATENTS

| Number | Name | Date |
|---|---|---|
| Re. 22,415 | Barr | Jan. 4, 1944 |
| 2,171,009 | Rostin et al. | Aug. 29, 1939 |
| 2,231,990 | Dreyfus | Feb. 18, 1941 |
| 2,393,909 | Johnson | Jan. 29, 1946 |
| 2,406,851 | Redcay | Sept. 3, 1946 |
| 2,417,164 | Huber | Mar. 11, 1947 |
| 2,449,071 | Hawk et al. | Sept. 14, 1948 |

OTHER REFERENCES

Meller, "Australian Chem. Institute Journal and Proc.," vol. 10, No. 5, May 1943, pages 123–129.

U. S. Naval Technical Mission in Europe, "The Synthesis of Hydrocarbon etc.," page 48, first paragraph.